(No Model.) 2 Sheets—Sheet 1.

J. L. CLARK.
TEA KETTLE.

No. 449,899. Patented Apr. 7, 1891.

Witnesses
Charles Colurt
May I. Clark

Inventor
John L. Clark
By his Attorney T. W. Lander (No Model.) 2 Sheets—Sheet 2.

J. L. CLARK.
TEA KETTLE.

No. 449,899. Patented Apr. 7, 1891.

Witnesses:
James H. Kennedy
Thomas F. Maher

Inventor.
John L. Clark,
by P. L. Lander,
his Atty.

UNITED STATES PATENT OFFICE.

JOHN L. CLARK, OF BANGOR, MAINE.

TEA-KETTLE.

SPECIFICATION forming part of Letters Patent No. 449,899, dated April 7, 1891.

Application filed January 25, 1890. Serial No. 338,141. (No model.)

*To all whom it may concern:*

Be it known that I, JOHN L. CLARK, a citizen of the United States, residing at Bangor, in the county of Penobscot and State of Maine, have invented a new and useful Improvement in Tea-Kettles; and I do hereby declare that the following is a full, clear, and exact description of the invention, which will enable others skilled in the art to which it appertains to make and use the same.

Throughout the description reference is made to the accompanying drawings in two sheets, forming a part of this specification, in which—

Figure 1:
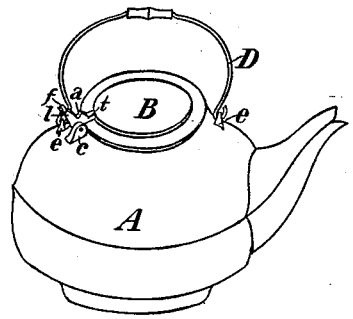
Figure 2:
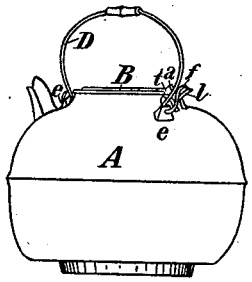
Figure 3:
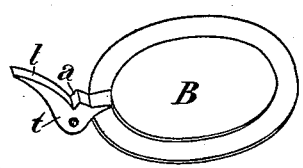
Figure 4:
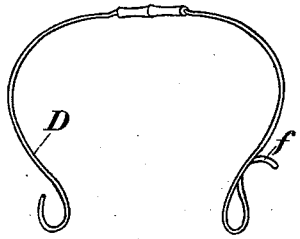
Figure 5:
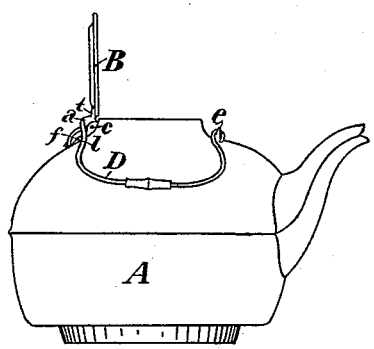
Figure 6:
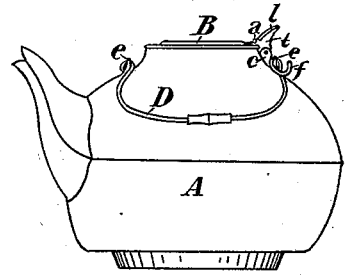
Figure 7:
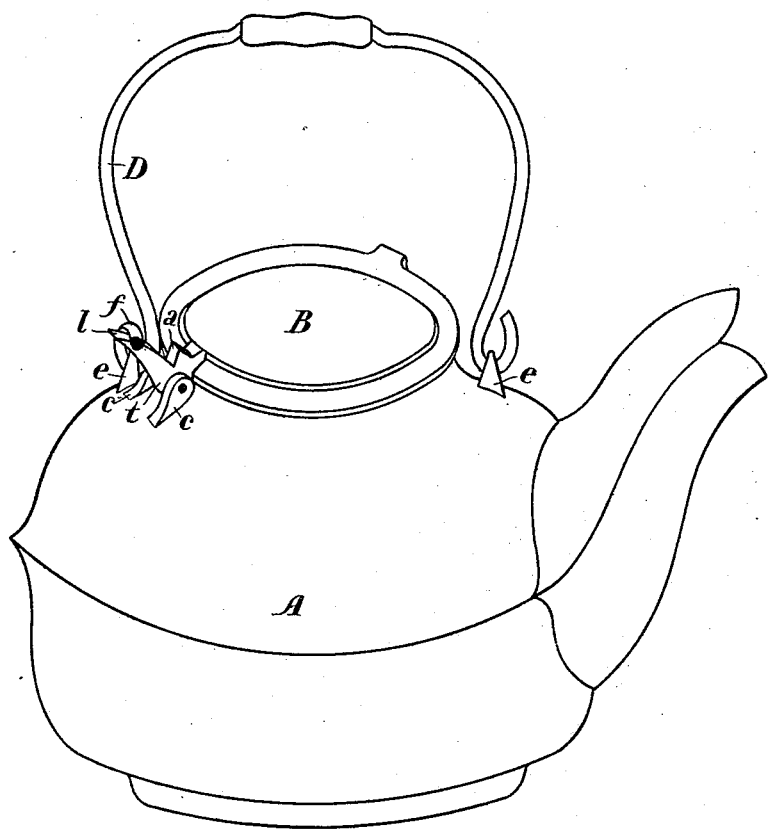

Figure 1 represents a perspective view of a tea-kettle provided with my improvement. Fig. 2 shows a part rear and part side elevation of the same. Fig. 3 is a perspective view of the cover, showing the improvement thereon. Fig. 4 is a similar view of the improved bail and handle of my device. Fig. 5 shows a side elevation of a tea-kettle containing my improvements with the cover raised. Fig. 6 is a similar view of the opposite side of the tea-kettle with cover closed and bail unhooked therefrom. Fig. 7 shows a perspective view of a tea-kettle containing my improvements.

Similar letters of reference refer to correspondingly like parts throughout the different figures.

The object of my invention is to provide an improvement in that class of tea-kettles designed with a hinged cover; and it consists of certain constructions and attachments hereinafter to be set forth and claimed, whereby the bail can be held in such positions as to prevent the handle from heating, and also that certain movements of the bail will operate the cover.

Referring to the drawings, A represents a common tea-kettle provided with the usual spout for pouring off its contents and having the usual bail-ears $e$ extending upward at their usual places.

B refers to the cover of the tea-kettle, hinged near one of the bail-ears. This hinged connection of the cover B with the kettle proper is accomplished by means of two small studs $c$ $c$, cast upon the said kettle at the desired place, projecting upward therefrom, and located a sufficient distance from each other to admit the extending tongue $t$ of the cover B between them. A small hole is drilled through each stud $c$ and coincides with a similar hole drilled through the tongue $t$ of the cover. A pin inserted and fitted in these holes confines and allows a movement of the cover in one direction only. This tongue $t$ I preferably cast directly upon the cover B, which latter is formed of a size and shape sufficient to close the opening in the top of the tea-kettle.

The form of the tongue $t$ is such that when the cover B stands in a direct vertical position its end or spur $l$ extends a short distance and fits the contour of the kettle at this place. This spur $l$ serves as a check to prevent the cover from going beyond a vertical line, and it can now be readily understood that when the cover B is closed the spur $l$ will project somewhat above the surface of the kettle.

Near the base of the tongue $t$ and projecting from the top thereof is a small shoulder $a$, constructed for a purpose hereinafter to be described. The spur $l$ projects above and beyond this shoulder $a$, as shown, Figs. 1, 2, and 3 of the drawings.

The bail D of my improved tea-kettle is preferably constructed from bent wire to the form usually used for such purposes, one end of which is bent and hooked into one of the ears $e$ of the kettle in the usual way, and the opposite end, after passing through the hole in the remaining ear near the cover-hinge, is bent upward and backward upon itself to confine it in this ear, and then curved over and outward to form a hook $f$, which projects at or nearly a right angle from the plane of the remaining portion of the bail. This hooked end $f$ of the bail D is constructed a sufficient length to extend a little above the height of the spur $l$ upon the cover B when the cover is closed and the bail proper in a vertical position, and this hooked end is bent toward and projects over the top of the spur $l$ near the end of the latter a sufficient distance to hold the said bail vertical when the cover is closed. It can now be readily understood that in the position shown in Fig. 1 of the drawings, the cover being closed and the bail standing nearly vertical, when a person presses the bail toward the side of the kettle upon which the cover B is hinged, the projecting hooked end $f$ of the said bail will bear down upon the spur *l* and begin and continue to raise the cover until the bail reaches a horizontal position at this side of the kettle, when the cover B will then stand in a vertical plane, as shown in Fig. 5 of the drawings, the latter remaining in this position by its own weight upon its hinge and the weight and leverage of the bail added thereto. This position leaves the kettle open, so that it can be readily filled, after which the cover is closed by raising the bail to the before-mentioned vertical position, the cover thereby dropping over the opening in the kettle by its own weight. When the cover B is raised by the movement just described, it can be seen by the view shown in Fig. 5 of the drawings that the bail in its horizontal position rests across the top of the spur *l*, near the base of the same, and behind the small shoulder *a*. Now in raising the bail to lower the cover B that portion behind the shoulder *a* presses against the latter to start the cover by forcing it off from a dead-center, so that all lost motion is prevented and the cover started immediately, obviating all tendency to slam. With this construction the cover, when closed, holds the bail in a vertical position and prevents the same from getting too hot at the handle.

At any time the hook *f* upon the end of the bail D can be made to release its hold from the projecting spur *l* of the cover by drawing the said bail toward the side of the kettle opposite that from which it has previously been operated. This movement will leave the cover closed and the bail out of the way, so that anything can be set upon and heated from the top of the cover, if desired.

Having thus described my invention, what I claim, and desire to secure by Letters Patent of the United States, is—

1. An improved tea-kettle consisting of the combination of a kettle-body with usual spout and bail-ears, small studs cast near one of the bail-ears for the purpose described, a cover with hinged tongue and projecting spur pivoted to said studs, a bail having one end hooked in the kettle-ear in the usual manner and its opposite end, after passing through the opposite bail-ear, bent upward and backward upon itself and then over or outward to form a hook extending at or nearly at a right angle plane from the bail, said extending hook adapted to engage the spur upon the cover to operate the latter, substantially in the manner shown, and for the purpose described.

2. An improved tea-kettle consisting of the combination of a kettle-body having bail-ears and the studs *c*, cast thereon, with a kettle-cover hinged to the said studs and provided with shoulder *a* and projecting lug *l*, for the purpose described, and a kettle-bail attached to the bail-ears in such manner that certain movements of the bail tend to open and close the cover, in the manner described, and substantially as shown and set forth.

In testimony that I claim the above I have hereunto subscribed my name this 22d day of January, A. D. 1890.

JOHN L. CLARK.

Witnesses:
CHARLES CLARK,
MAY I. CLARK.